Dec. 5, 1961 F. B. SMITH, JR., ET AL 3,012,094

BURST SYNCHRONIZED OSCILLATOR SYSTEM

Filed Nov. 30, 1956 2 Sheets-Sheet 1

INVENTORS
FREDERIC B. SMITH, JR &
ALBERT MACOVSKI
BY
ATTORNEY

INVENTORS
FREDERIC B. SMITH, JR. &
ALBERT MACOVSKI
BY
[signature]
ATTORNEY 3,012,094

BURST SYNCHRONIZED OSCILLATOR SYSTEM

Frederic B. Smith, Jr., Oceanside, and Albert Macovski, Massapequa, N.Y., assignors to Radio Corporation of America, a corporation of Delaware Filed Nov. 30, 1956, Ser. No. 625,293
9 Claims. (Cl. 178—5.4)

This invention relates to a burst synchronized color subcarrier oscillator system which is especially useful in a color television receiver.

According to the color television broadcasting standards in the United States, a burst of at least eight cycles of the color subcarrier frequency of 3.579545 megacycles is transmitted immediately following each deflection synchronizing pulse. In the receiver, the bursts are employed to control the frequency and phase of a local color subcarrier oscillator. Outputs of the oscillator, in at least two different phases, are applied to synchronous color demodulating means by which the color information is extracted from the received signal for reproduction of the color image.

It is an object of this invention to provide an improved burst synchronized oscillator system which is particularly stable and reliable in operation and which is relatively simple and inexpensive in construction.

It is another object to provide an improved burst synchronized oscillator system which provides additional outputs for providing a color killer control voltage and an automatic chroma control voltage.

It is a further object to provide an improved burst synchronized oscillator system receptive to the output of a chroma and burst amplifier and including means to perform the burst separating function.

One burst synchronized oscillator system constructed according to the teachings of this invention includes a crystal oscillator circuit having an electrode to which a direct-current voltage may be applied to control the frequency and phase of the oscillations within a small range about the natural frequency of the piezoelectric crystal. An oscillator control voltage is generated by a phase detector circuit including a vacuum tube having a control grid and having an anode or plate coupled to an output circuit. An output of a chroma and burst amplifier and a flyback pulse source are coupled to the control grid. An output of the crystal oscillator is coupled to the output circuit of the vacuum tube in the phase detector. The vacuum tube develops self bias on the grid to keep the tube non-conductive except during the peaks of the bursts applied to the grid. By means of a storage capacitor in the output circuit of the phase detector, a direct-current voltage is developed having a median value when the bursts and local oscillations are in phase quadrature, a minimum value when they are in phase, and a maximum value when they are 180 degrees out of phase. This control voltage is applied to the crystal oscillator to maintain it in synchronism with the bursts. When a monochrome signal is received, the absence of bursts results in a different grid self bias voltage. Therefore the grid voltage may be utilized to provide automatic chroma control and color killer actuation.

In order that the invention may be fully applied and the advantages thereof readily obtained in practice, embodiments of the invention are described hereinafter with reference to the accompanying drawings in which.

Figure 1:
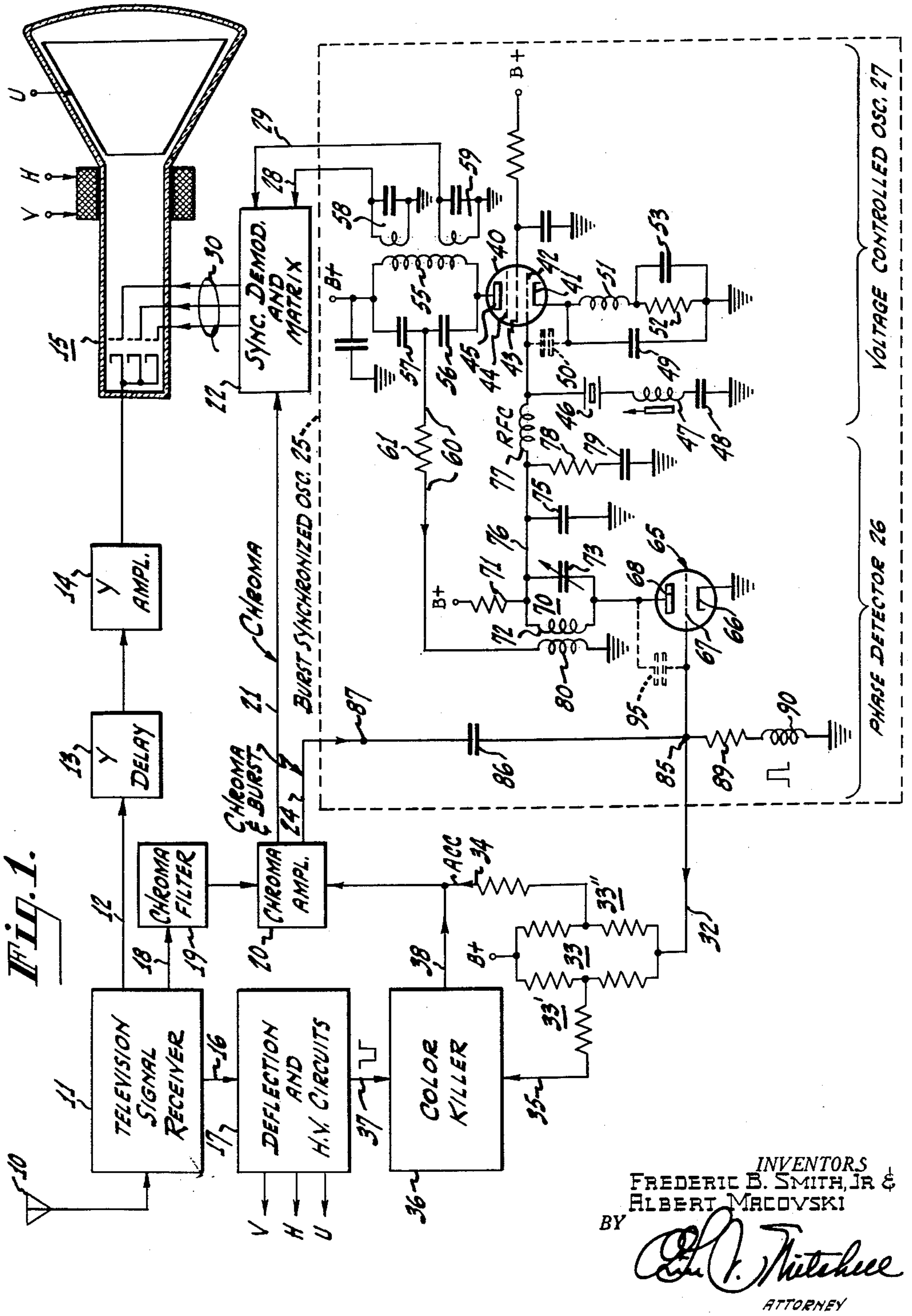
FIGURE 1 is a block diagram of a color television receiver including a burst synchronized oscillator system constructed according to the teachings of the invention and represented in circuit diagram form.

Referring to the color television receiver system shown in FIGURE 1, a signal received by antenna 10 is applied to a television signal receiver 11 which includes a radio frequency amplifier, a converter, an intermediate frequency amplifier, and a second detector. One output (not shown) from the receiver 11 is employed to reproduce the audio portion of the received signal. Another output 12 of the receiver 11 is applied through a Y delay 13 and a Y amplifier 14 to the cathodes of a color kinescope 15. This Y channel carries the luminance portion of the television signal. A third output 16 from the second detector in the receiver 11 is applied to deflection and high voltage circuits 17. Vertical deflection waves, horizontal deflection waves, and an ultor voltage is coupled from the outputs V, H, and U, respectively of the circuits 17 to the correspondingly designated terminals of the color kinescope 15.

A fourth output 18 from the second detector in the receiver 11 is applied through a chroma or chrominance filter 19 to a chroma or chrominance amplifier 20. One output 21 of the chroma amplifier 20 is applied to synchronous demodulating and matrixing means 22. An output from the chroma amplifier 20 is also applied over lead 24 to a burst synchronized oscillator 25 shown within a dashed line box. Color subcarrier oscillations at two different demodulating phases are applied from the oscillator 25 by leads 28 and 29 to the synchronous demodulators and matrix 22. Three outputs 30 from the demodulators and matrix 22 convey three different color difference signals to respective grids of the color kinescope 15. The color difference signals applied to the grids cooperate with the luminance signal applied to the cathodes to modulate the three electron beams with signals corresponding respectively with three different colors.

An output on lead 32 from the burst synchronized oscillator 25 is applied through a threshold setting network 33″ and then employed as an automatic chroma control voltage applied over lead 34 to the chroma amplifier 20. The output on lead 32 from the burst synchronized oscillator 25 is also applied through the threshold setting network 33′ and through lead 35 to a color killer circuit 36. The color killer circuit is also receptive over lead 37 to a flyback pulse from the high voltage transformer in the deflection and high voltage circuits 17. An output on lead 38 from the color killer 36 is applied to the chroma amplifier 20 to deactivate the chroma amplifier when monochrome signals are being received.

The burst-synchronized oscillator 25 includes a phase detector circuit 26 and a voltage controlled crystal oscillator 27. An output of the crystal oscillator 27 is applied to the phase detector 26 where it is compared with the received bursts. A frequency control voltage is developed in the phase detector 26 and is applied to the oscillator 27 to maintain the oscillation in frequency and phase with the received bursts. The burst-synchronized oscillator 25 will now be described starting with a description of the oscillator 27, and following with a description of the phase detector 26 as operated in conjunction with the oscillator.

The voltage controlled oscillator 27 (meaning an oscillator having its frequency and phase controlled by an input voltage) is designed for operation at 3.579545 megacycles in accordance with the color subcarrier standards in the United States. The oscillator 27 is a crystal oscillator arranged so that the entire input capacitance of the vacuum tube is coupled across the crystal, and so that the crystal is not in the feedback path of the oscillator. In the circuit of oscillator tube 40, oscillation excitation is provided by the circuit between the control grid 42 and cathode 41 which includes a piezo-electric crystal 46, a fine frequency adjusting inductor 47, a frequency range centering capacitor 48, a capacitor 49, and the interelectrode capacitance 50 between the cathode 41 and control grid 42. The frequency adjusting inductor 47 can provide a frequency adjustment of about plus and minus one kilocycle. The ratio of capacitors 49 and 50 determines the amount of feedback from the cathode to the grid. Capacitor 50 should be as small as possible to maximize the sensitivity of the oscillator in cycles per volt of control voltage applied. A radio frequency choke 51 isolates the cathode 41 from ground. A cathode resistor 52 is employed to insure self starting of the oscillator when B+ is switched on and the tubes are not yet conductive. Under this condition, B+ is applied to the control grid 42 and would otherwise tend to prevent oscillation. The cathode resistor 52 supplies cathode bias during this interval and permits oscillations to start as the tubes become conductive. The cathode resistor 52 is bypassed by capacitor 53 so that there is no degeneration at the oscillation frequency.

The electron-coupled output circuit from the anode 45 of the oscillator tube includes an inductor 55 and capacitors 56 and 57. Circuits 58 and 59 are coupled to the inductor 55 and constitute phase splitting and shifting means. The circuits are tuned to provide outputs from the oscillator 27 at the two different predetermined phases of demodulation. The circuits are coupled by leads 28 and 29 to the synchronous demodulators 22. The junction point between the capacitors 56 and 57 provides an oscillation output at reduced voltage for feeding back on lead 60 to the phase detector 26. An isolating resistor 61 is inserted in the lead 60.

The voltage controlled oscillator 27 oscillates at a frequency within a relatively small range as determined by the resonant frequency of the piezoelectric crystal 46. The exact frequency and phase of oscillation is affected by the setting of the variable inductor 47 and the grid-to-cathode input capacitance 50 of the oscillator tube 40. The value of the input capacitance 50 varies with the gain of the tube 40 due to the Miller effect, and the gain in turn varies with the grid bias applied to the tube. Therefore, a direct current control voltage applied to the grid 42 of the oscillator tube changes the value of the capacitor 50 in parallel with the crystal 46 and controls the frequency and phase of the oscillations in the oscillator. The control voltage is obtained from the phase detector 26. A frequency change of 50 cycles per volt of control voltage has been obtained in practice.

As stated previously, the oscillator 27 is one wherein all the input capacitance 50 of the vacuum tube 40 is effectively across, or in a circuit parallel with, the crystal 46. Therefore, small changes of input capacitance 50 due to Miller effect have maximum effect on the frequency of oscillation of the oscillator. The oscillator 27 is also one wherein the crystal 46 is not included in the feedback path of the oscillator. The feedback path is from the cathode 41 through the capacitance 50 to the control grid 42. The crystal 46 is not in this feedback path. Therefore, changes in operating frequency do not result in substantial changes of oscillator output amplitude. The oscillator 27 also includes an electron coupled output circuit which renders the oscillator frequency relatively independent of load variations.

The phase detector 26 includes an amplifying or electron discharge device 65 which may be a vacuum tube having electrodes in an evacuated envelope common to oscillator tube 40. The vacuum tube 65 has a cathode 66 connected to ground, a control grid 67, and an anode 68 coupled through a tuned circuit 70 and an anode resistor 71 to the B+ terminal of a source of unidirectional potential. The circuit 70 includes an inductor 72 and a capacitor 73 tuned to resonance at the color subcarrier frequency of about 3.58 megacycles. A storage capacitor 75 is connected from ground to the junction point 76 between the tuned circuit 70 and the anode resistor 71. The junction point 76 is connected through a radio frequency choke 77 to the control grid 42 of the oscillator 27 to convey the frequency controlling voltage to the oscillator. A resistor 78 and capacitor 79 are connected from the junction point 76 to ground to provide the anti-hunting action normally employed in automatic frequency and phase control systems. The output of the oscillator 27 on lead 60 is coupled to the tuned circuit 70 of the phase detector 26 by means of an inductor 80 magnetically coupled to the inductor 72. The control grid 67 of the phase detector tube is connected to a junction point 85. The point 85 is coupled through a capacitor 86 to a chroma and burst input terminal 87; and is connected through a grid resistor 89, and a source 90 of positive pulses, to ground. The source 90 of positive pulses is most conveniently constituted by a secondary coil on the high voltage transformer (not shown) in the deflection and high voltage circuits 17. The secondary coil provides flyback pulses existing at the times of the occurrence of color subcarrier bursts on the back porches of the deflection synchronizing pulses of the received television signal.

The junction point 85 is also connected by lead 32 to a threshold setting network 33 from which an automatic chroma control voltage is obtained on lead 34 and a color killer actuating voltage is obtained on lead 35.

In operation, a portion of the output of oscillator 27 is fed back over lead 60 to the anode circuit 70 of the phase detector. Bursts applied from the chroma amplifier 20 to the grid of the phase detector are compared in the phase detector with the oscillations from the oscillator 27. A voltage is developed across the storage capacitor 75 which is applied to the grid of the oscillator to maintain the oscillations in fixed synchronism and phase with the bursts.

The detailed operation of a circuit including an automatic phase and frequency control feedback loop is most clearly described by explaining the conditions when the oscillations are locked in phase, and then pointing out what happens if the oscillations tend to get out of phase. When the oscillator 27 is locked in fixed phase with the bursts applied to the grid of the phase detector, the direct current voltage developed across the storage capacitor 75 and applied to the control grid of the oscillator has a given or median value. If the oscillator frequency or phase tends to shift away from the frequency or phase of the bursts, the direct current voltage on the storage capacitor changes in such a direction as to prevent the change in oscillator frequency or phase.

The balanced or locked-in conditions are originally established by the procedure of varying the frequency set adjusting inductor 47 until the oscillator frequency is exactly 3.579545 megacycles with that value of control voltage on storage capacitor 75 which results when a signal including bursts is applied to the input of the phase detector. The actual value of control voltage is a function of the value of anode resistor 71.

The grid 67 of the phase detector tube 65 is self biased to be normally non-conducting and to conduct only during the peaks of the burst cycles applied thereto. The burst is superimposed on the positive flyback pulse as illustrated in curve A of FIG. 2. Curve B shows the oscillations fed back from the oscillator 27 to the plate circuit 70 of the phase discriminator by means of inductor 80. The phase detector tube 65 conducts during the peaks of the bursts, which coincide with the circled points on the oscillations B. The voltage developed on storage capacitor 75 and applied to the oscillator 27 corresponds with the level of the circled points on the oscillations B. If the oscillations B from the oscillator 27 tend to shift in phase, the peaks of the burst cycles occur at a higher or lower level on the oscillations B and develop a higher or lower voltage, respectively, on the storage capacitor 75. This voltage is applied to the grid of the voltage controlled oscillator 27 to bring the oscillations back in quadrature phase with the bursts.

During monochrome transmission, there are no bursts present on the grid of the phase detector tube. However, oscillations from the oscillator 27 existing in the plate circuit 70 of the phase detector are coupled to the grid 67 through the distributed and inter-electrode plate-to-grid capacitance 95. The oscillations coupled through the capacitance 95 to the grid are shifted 90 degrees in phase because of the phase shifting action of a capacitor 95 and resistor 89 in series. Therefore, in the absence of bursts, the wave on the grid 67 of the phase discriminator may be as illustrated by curve C in FIGURE 2. A lower grid bias voltage is developed, but the phase discriminator tube still conducts only at the times corresponding with the circles on the oscillator curve B. The oscillator control voltage on the storage capacitor 75 is maintained so that, in the absence of bursts, the oscillator 27 continues to oscillate at substantially the same frequency as when bursts are present. Stated another way, when bursts are absent, the control voltage on storage capacitor 75 does not change and force the oscillator frequency away from the frequency existing when bursts are present.

Figure 2:
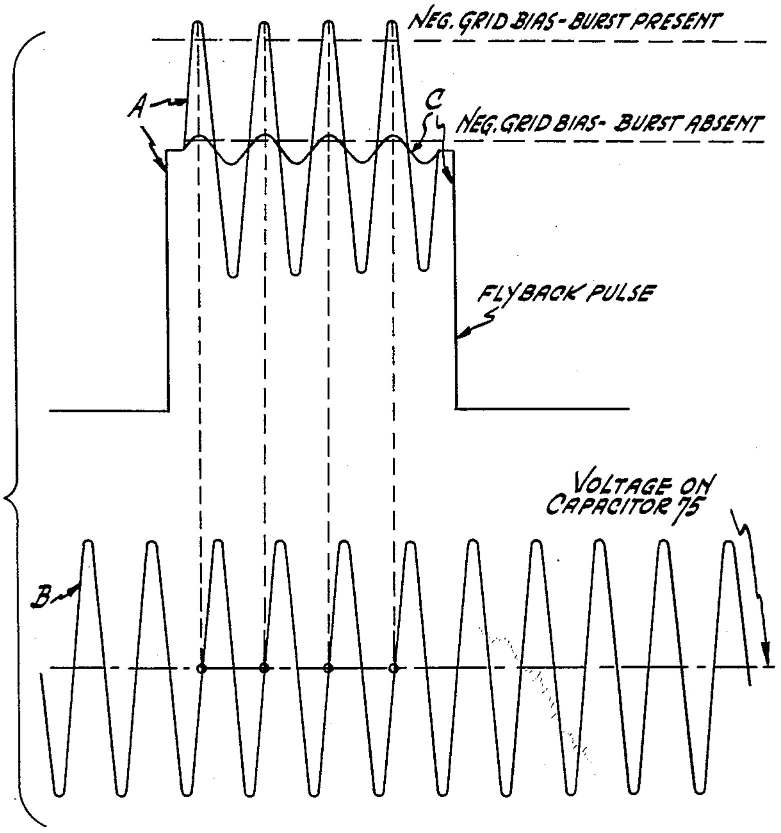
FIGURE 2 shows voltage waveforms which will be referred to in describing the operation of the circuit of FIGURE 1.

As illustrated in FIG. 2, the negative grid cut-off bias voltage developed on grid 67 and point 85 of the phase detector has one value when bursts are absent, and a higher (more negative) value when bursts are present. This change in voltage at point 85 is coupled through lead 32, a threshold setting network 33′ and a lead 35 to the color killer 36. The color killer operates in response to the voltage applied thereto to deactivate the chroma amplifier 20 during trace or scanning time when bursts (and color information) are not included in the received signal.

The grid bias voltage at point 85 is also used to provide an automatic chroma control voltage. Variations in the amplitude of the bursts result in corresponding variations in the amplitude of negative grid bias at point 85. The greater the amplitude of the bursts, the more negative the potential at point 85. This negative potential at point 85 is coupled through lead 32, the threshold setting network 33″ and lead 34 to the chroma amplifier 20. When bursts are present, the amplification of the chroma and bursts signal in the chroma amplifier is controlled to provide a substantially constant output level despite fluctuations in the strength of the received chroma signal.

Figure 3:
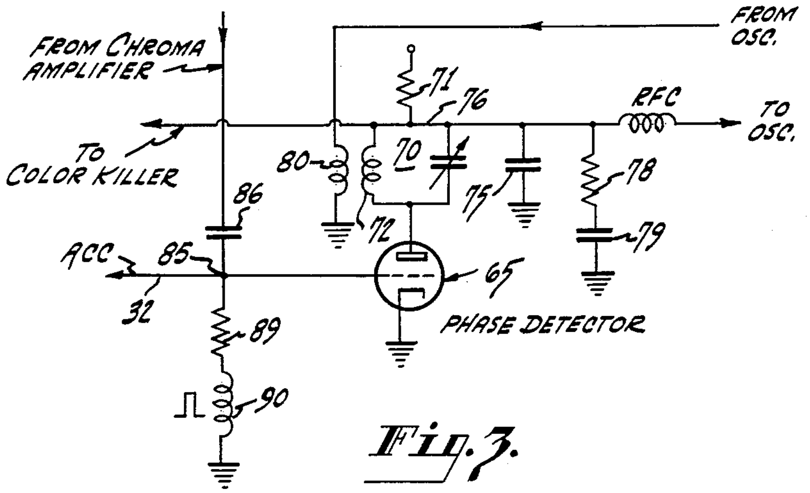
FIGURE 3 is a circuit diagram of a phase detector similar to that in FIGURE 1 but providing a color killer control voltage from a different point in the phase detector circuit.

FIG. 3 shows a phase detector which is the same as the phase detector 26 in FIG. 1, except that the color killer actuating voltage is taken off from point 76 in the plate circuit. In this arrangement, a slightly different initial procedure is followed for adjustment of the phase detector and oscillator combination. The color killer voltage should be zero with respect to ground in the absence of bursts (when a monochrome signal is received). Since the oscillator control voltage is taken from the same point 76, the control voltage should also be zero. The value of the plate resistor 71 is selected to provide this zero voltage in the absence of bursts. When bursts are applied to the phase detector, the frequency set inductor 47 in the oscillator is set to yield a sufficiently negative control voltage at point 76 to deactivate the color killer. This type of color killer is noise immune.

It is apparent that according to this invention there is provided an improved burst synchronized oscillator for use in a color television receiver, and providing outputs suitable for operating automatic chroma control means and a color killer circuit.

What is claimed is:

1. In a color television receiver including a source of a chroma and burst signal and a source of pulses coinciding in time with said bursts, a burst synchronized oscillator system comprising, a crystal oscillator having an electron coupled output circuit, said oscillator having a natural frequency of oscillation determined by the crystal therein and having a control terminal to which a direct-current control voltage can be applied to vary a reactance in circuit with said crystal and thereby control the frequency of oscillation over a small range, a phase detector including an electron discharge device having an input circuit and an output circuit, means to couple the output of said oscillator to the output circuit of said phase detector, means to couple said source of chroma and burst signal and said source of pulses to said input circuit of the phase detector, said input circuit being constructed to generate a self bias which permits said discharge device to conduct solely during the peaks of cycles of said bursts, whereby a control voltage is developed in the output circuit of said phase detector having a median value when the oscillations and bursts are in phase quadrature, means to apply said control voltage to said control terminal of the oscillator, and means to derive automatic chroma control and color killer control voltages from said phase detector.

2. In a color television receiver for utilizing a composite color television signal including a color synchronizing component comprising a multicycle burst of color subcarrier frequency waves, a burst synchronized oscillator system comprising, a voltage controlled crystal oscillator circuit having an input terminal and having an output circuit providing a frequency of oscillation corresponding with the value of direct-current voltage applied to said terminal, said oscillator including an amplifying device and a crystal connected in parallel with the input capacitance of said amplifying device, a phase detector circuit including a second amplifying device including cathode, control grid and anode electrodes, means for applying said signal including said color subcarrier burst component to said control grid, a source of keying pulses occurring in substantial time coincidence with the occurrence of said color subcarrier frequency bursts, means for applying said keying pulses to said control grid a coupling from the output circuit of said oscillator to the anode of said second amplifying device, means for deriving a control voltage from the anode of said second amplifying device, means for applying said control voltage to the input terminal of said oscillator such as to control the input capacitance of said first named amplifying device, self biasing means associated with the control grid and cathode electrodes of said second amplifying device for providing a bias which permits said device to conduct solely at the peaks of the burst cycles, the control voltage derived from the anode of said second amplifying device having a median value when said bursts and the oscillations applied to the anode of said second amplifying device are in phase quadrature, sufficient coupling being provided between said anode and said control grid so that in the absence of bursts on said control grid said applied oscillations appear on said control grid in phase quadrature relationship to the oscillations appearing at said anode and with sufficient amplitude to assure conduction of said second amplifying device only at time intervals appropriate to maintenance of said control voltage at said median value and means coupled to the control grid of said second amplifying device to derive an automatic chroma control voltage.

3. In a color television receiver including a source of color synchronizing bursts, a burst synchronized oscillator system comprising in combination an amplifying device including cathode, control grid, screen grid, and anode electrodes, means for applying a positive operating potential to said screen grid, a first element presenting a relatively high impedance at the frequency of said bursts and a relatively low impedance to direct current, a second element presenting a relatively low impedance at the frequency of said bursts and a relatively high impedance to direct current, means for connecting said first and second elements in series between said cathode and a point of reference potential, a biasing resistor connected in shunt with said second element, a capacitor connected in shunt with the series combination of said first and second elements, the capacitance value of said capacitor being chosen relative to the inter-electrode capacitance presented between said control grid and said cathode such as to permit regenerative feedback via said inter-electrode capacitance of a magnitude sufficient to sustain the generation of oscillations by said amplifying device, means for stabilizing the frequency of oscillations generated by said amplifying device, said frequency stabilizing means comprising a crystal in series with a variable inductor, the series combination of said crystal and variable inductor being coupled between said control grid and said point of reference potential, said crystal being cut for resonance at a frequency in the immediate vicinity of the frequency of said bursts, said variable inductor providing a vernier adjustment of the effective resonant frequency of said crystal frequency stabilizing means, means for applying positive operating potential to said anode via an output circuit tuned to substantially the frequency of said bursts, phase detector means coupled to said burst source and to said output circuit for developing a direct current voltage indicative of the phase relationship between said bursts and the oscillations appearing in said output circuit, and means for varying the input capacitance of said amplifying device in accordance with said control voltage to maintain the oscillations appearing in said output circuit in frequency synchronism and in substantially fixed phase relationship with said bursts, said last named means comprising means for applying said control voltage to said control grid.

4. Apparatus in accordance with claim 3 wherein said phase detector means comprises a second amplifying device having cathode, control grid and anode electrodes, an input circuit coupled with said control grid and cathode electrodes of said second amplifying device, a coupling between said burst source and said input circuit, said input circuit comprising self biasing means which permit said second amplifying device to conduct solely during the peaks of successive cycles of said bursts, a coupling between said first amplifying device output circuit and the anode of said second amplifying device, a storage capacitor coupled to the anode of said second amplifying device, means for applying positive operating potential via a resistor to said anode, the voltage developed across said storage capacitor being dependent upon the phase relationship between the oscillations applied to said anode and the intervals of conduction of said second amplifying device whereby said developed voltage is representative of the phase relationship between said applied oscillations and the bursts appearing at said control grid and has a median value when the phase relationship therebetween is phase quadrature, sufficient coupling being provided between said anode and said control grid of said second amplifying device so that in the absence of bursts appearing at said grid said applied oscillations are coupled to said grid in appropriate phase and amplitude to cause conduction of said second amplifying device at intervals appropriate to maintenance of voltage developed across said capacitor at substantially said median value, and means for utilizing the voltage developed across said capacitor as said control voltage for application to the control grid of said first named amplifying device.

5. In a color television receiver wherein an amplifying channel is provided for the chrominance component of received color television signals, apparatus in accordance with claim 4 including means for controlling the gain of said amplifying channel in accordance with said bias developed in the input circuit of said second amplifying device.

6. In a color television receiver wherein an amplifying channel is provided for the chrominance component of received color television signals, apparatus in accordance with claim 4 wherein means are provided for utilizing the bias developed in the input circuit of said second amplifying device to disable said chrominance component amplifying channel in the absence of bursts appearing at said control grid of said second amplifying device and to enable the operation of said chrominance component amplifying channel when bursts appear at the control grid of said second amplifying device.

7. In a color television receiver including a source of color synchronizing bursts, a burst synchronized oscillator system comprising, in combination, an oscillator providing an oscillation output having a frequency nominally equal to the frequency of said bursts, phase detecting means coupled to said burst source and said oscillator for developing a control voltage representative of the phase relationship between said bursts and said oscillation output, and means for utilizing said control voltage to control the operation of said oscillator so as to maintain said oscillation output in frequency synchronism and substantially fixed phase relationship with said bursts, said phase detecting means comprising the combination of an electron discharge device having a cathode, a control grid and an anode, an input circuit coupled between said control grid and said cathode, means for applying said bursts to said input circuit, said input circuit responding to the application of said bursts to generate a bias which permits said device to conduct only during the positive peaks of successive cycles of said bursts, a source of positive potential, a resistor and a capacitor connected in series between said positive potential source and a point of reference potential, means for connecting said anode to the junction of said series connected resistor and capacitor, and means for applying said oscillation output to said anode so that said control voltage is developed across said capacitor and has a median value when said bursts and said oscillation output are substantially in phase quadrature, sufficient coupling being provided between said anode and said control grid so that in the absence of appearance of said bursts at said control grid a phase shifted version of said oscillation output, substantially in phase quadrature with the oscillation output applied to said anode, appears at said control grid with sufficient amplitude to cause conduction of said device at intervals appropriate to maintenance of such control voltage at said median value.

8. In a color television receiver including a channel for amplifying the chrominance component of received composite color television signals, apparatus in accordance with claim 7 also including means for disabling said chrominance component amplifying channel when the bias generated by said input circuit drops below a predetermined threshold value.

9. Apparatus in accordance with claim 8 also including means for controlling the gain of said chrominance component amplifying channel when enabled in accordance with variations in said generated bias above said predetermined threshold value.

References Cited in the file of this patent

UNITED STATES PATENTS

| | | |
|---|---|---|
| 2,408,684 | Roberts | Oct. 1, 1946 |
| 2,744,155 | Kihn | May 1, 1956 |
| 2,751,430 | Kelly | June 19, 1956 |
| 2,802,045 | Landon | Aug. 6, 1957 |
| 2,910,581 | Richman | Oct. 27, 1959 |

OTHER REFERENCES

Color TV, Rider Pub., March 1954, pp. 141–142. (Copy in Div. 41.)

RCA CT Receiver, Model CT-100, March 1954, pp. 32–33. (Copy in Div. 41.)